United States Patent

Kanevsky et al.

[11] Patent Number: 5,835,888
[45] Date of Patent: Nov. 10, 1998

[54] STATISTICAL LANGUAGE MODEL FOR INFLECTED LANGUAGES

[75] Inventors: Dimitri Kanevsky, Ossining; Salim Estephan Roukos, Scarsdale, both of N.Y.; Jan Sedivy, Praha, Czech Rep.

[73] Assignee: International Business Machines Corporation, Armonk, N.Y.

[21] Appl. No.: 662,726

[22] Filed: Jun. 10, 1996

[51] Int. Cl.$^6$ .................................. G06F 17/28
[52] U.S. Cl. ................ 704/9; 704/10; 704/243; 704/257
[58] Field of Search ................ 704/9, 1, 10, 243, 704/241, 244, 255, 257, 256, 240; 707/531, 532, 533, 534

[56] References Cited

U.S. PATENT DOCUMENTS

| | | | |
|---|---|---|---|
| 4,342,085 | 7/1982 | Glickman et al. | 707/532 |
| 4,831,550 | 5/1989 | Katz | 704/240 |
| 4,882,759 | 11/1989 | Bahl et al. | 704/243 |
| 5,467,425 | 11/1995 | Lau et al. | 704/243 |
| 5,490,061 | 2/1996 | Tolin et al. | 704/2 |
| 5,680,511 | 10/1997 | Baker et al. | 704/2 |

FOREIGN PATENT DOCUMENTS

| | | |
|---|---|---|
| 0 282 272 A1 | 9/1988 | European Pat. Off. . |
| 0 376 501 A2 | 7/1990 | European Pat. Off. . |
| 406035902A | 2/1994 | Japan . |

*Primary Examiner*—Joseph Thomas

[57] ABSTRACT

A statistical language model for inflected languages, having very large vocabularies, is generated by splitting words into stems, prefixes and endings, and deriving trigrams for the stems, ending and prefixes. The statistical dependence of endings and prefixes from each stem is also obtained, and the resulting language model is a weighted sum of these scores.

21 Claims, 8 Drawing Sheets

STATISTICAL LANGUAGE MODEL FOR INFLECTED LANGUAGES

FIELD OF THE INVENTION

The invention relates to speech recognition systems for inflected languages.

BACKGROUND OF THE INVENTION

Many languages, including Slavonic and Japanese languages, are characterized by the use of inflection. Thus, the size of vocabularies in these languages is very large, in some cases on the order of several million words. These extremely large vocabularies make it difficult to use standard statistical methods, such as trigram models, to derive a language model ("LM") that is useful in speech recognition systems.

To use as an example the Czech language, one basic word form (or "lemma", or "dictionary entry") can generate several hundred word forms. For example, Czech has seven different cases for nouns, in both singular and plural, expressed by various endings, for a total of fourteen mostly distinct forms. Moreover, Czech adjectives have gender, gradation and negation, which are expressed by some combination of prefixes, suffixes and endings (336 forms, about 60 distinct for the most common adjective type). Verbs are even more difficult, having some 300 distinct forms. A vocabulary of 40,000 base forms (i.e., corresponding to 40,000 dictionary entries in a usual dictionary) represents about 2.5 million word forms.

The excessive size of such a vocabulary is too large to access using a real-time decoder, and to train the language model ("LM") well enough, we would need a very large corpus of data.

The n-gram modelling of words (particularly, for n=3) has been successful for many years in speech recognition systems for vocabularies having up to 64,000 words, with a training corpus of a few hundred million words. For languages with much larger vocabularies (several hundred thousand words) or when only small training corpora are available (a few million words), word-based language models are inadequate.

Previous models, for use in the French and Italian languages, were described in H. Cerf-Danon, and M. Elbeze, "Three different probabilistic Language Models: Comparisons and Combination," Proceedings of ICASSP-91, vol. 1, pp. 297–300, and G. Maltese, and F. Mancini, "An Automatic Technique to include grammatical and morphological information in a trigram-based language model" ICASSP-92, pp. I-157–161. These previous models relied on grouping words into classes based on their part-of-speech ("POS") information, and building a trigram model for sequences of classes, followed by a model that predicts the word given the predicted class. In addition, a lemma model was evaluated in Cerf-Danon. The lemma is the root spelling for a word (e.g., the root spelling of the word "reading" is "read"). In general, given the lemma and the POS, then typically only one word spelling is probable (e.g., given lemma="read" and POS=verb-in-gerund-form, the word "reading" is probable), but there are a few exceptions. The previous models use two trigram models: one to predict the POS of the next word, and a second to predict the lemma. Then a third model predicts the word given the predicted lemma and POS. The lemma model has been made to depend on the lemmas of the previous two words as opposed to the previous two words themselves.

These models, however, even when combined with a word trigram model by linear interpolation, are not useful for inflected languages with large vocabularies like Czech or Russian. Given the lemma and POS there can be many different endings. For example, for a lemma='KRASN' and POS=adjective there can be the following endings: "AIA", "OJ", "YMI", "OE", "UJU", "OGO", "YJE", "OMU", etc. The lemma+POS model, however, does not provide any statistical clue about these varieties of endings, which all belong to the same POS class. This makes it difficult to distinguish such Russian words as "KRASNAJA" (meaning "red", as in "red star") and "KRASNOE" (meaning "red", as in "red sun"), which have very similar acoustic pronunciations. Furthermore, the endings "AJA" and "OE" have different statistics inside the same POS class (adjectives) and different statistical dependencies on previous endings (e.g., "AJA" cannot precede the ending "E", e.g., "KRASNAJA ZVEZDA" ("red star") but "KRASNOJE SOLNZE" ("red sun")). These models, when combined with a word trigram model by linear interpolation, lead to an insignificant improvement over the usual word trigram model.

The invention described herein is superior to the above-described techniques since it allows the building of language models that fully incorporate the morphological features (prefixes and endings).

SUMMARY OF THE INVENTION

In accordance with the present invention, a language model is constructed by splitting words into stems, prefixes and endings. The following statistical n-grams can be derived: for stems only; for endings only; and for stems and endings after separation. The statistical dependence of endings and prefixes from stems is also obtained. The resulting LM is a weighted sum of these statistical scores.

To compress the size of the vocabulary to a manageable size (for example, 40,000) and to be able to train LMs reasonably well on a training corpus of manageable size (on the order of 100 million words) we propose the following preferred method:

1. Identify all the possible endings in a particular language. This can be done with a vocabulary for the language in question.

2. Extract the endings from all dictionary words in the language.

One way to do this is to use a vocabulary having all forms information, i.e., a dictionary in which endings and stems are already identified. Another way is to compare all prefixes in the language with the words in the dictionary, and to remove the longest match from each word. The same procedure can be used to extract endings from the end of the word. This may not lead to an optimum breakdown, but it is very simple and does not require any special information.

3. Take a sufficiently large text and using the algorithm from step 2 above, generate a text composed from stems and endings. Consider stems and endings as separate dictionary entries. (stems and endings are separated by spaces.)

4. Construct the vocabulary from the text generated in step 3. This vocabulary will have a substantially smaller number of dictionary entries than the dictionary from which the vocabulary was generated.

5. For each stem, construct a set of probabilities for the endings. (Note the technique described herein can be extended to utilize prefix data as well, in which case a separate set of probabilities for prefixes will also be constructed.) The set of probabilities for prefixes (if used) will have a size based on the number of prefixes, and the set of probabilities for endings will have a size based on the number of endings. Then use the text from step 2 and generate probabilities of endings (and prefixes, if applicable) for each vocabulary entry. The size of sets of probabilities should be small compared to the total number of dictionary entries.

6. Generate a LM for any combination stems and endings which would give the highest recognition score.

In the present invention, the "next word" in a trigram is actually the stem or ending that follows the present "word" (which itself is a stem or ending). We propose to calculate the probability of a word as a weighted sum of output probabilities of several LMs. The first LM is built on stems. The next LM may be implemented as a single look-up to the probability sets for each stem. Other LMS are based on a combination of stems and endings and will capture the information of context and other linguistic qualities contained in endings for the particular language in question.

The vocabulary consists of stems and endings, and it is convenient to label the stems and endings differently. One example notation is:

STEM< and

>END where STEM can be any stem in the vocabulary, and the symbol "<" denotes it as a stem, and END is any ending in the vocabulary, and the symbol ">" denotes it as a word ending.

In past decoding procedures there was no constraint for choosing a next word given the current decoded word, other than probability criteria (the most probable word was chosen). Using the table of allowed endings, the following novel decoding procedure can be employed in accordance with the invention:

Given decoded stem S, the decoder produces a list of endings E1, E2, E3, . . . , which can be used as the next "word". These candidates should be endings only if the previous stem cannot be a separate word. These endings are chosen only from allowed precomputed strings of endings (from the language model for endings). This is equivalent to setting probabilities Prob (END|STEM)=0 if the END is not allowed given the stem.

For example, stems will always be followed by the symbol "<" and endings preceded by the symbol ">". For example, the Russian stem and ending combination ЛЕТ< > ИТ gives rise to the word ЛЕТИТ.

There can also be an "empty" ending ">", which can be used for stems that themselves are words.

The table of stems and allowed endings contains lists of all endings that can follow a given stem. If a stem can itself be a complete word, it has in a list of allowed endings an empty end ">".

Since current language models are trained with smoothing and actually do not have zero probabilities, care should be taken to allow zero probabilities for bigrams and trigrams in the dictionary with stem and ending entries.

DESCRIPTION OF THE PREFERRED EMBODIMENTS

Figure 1:
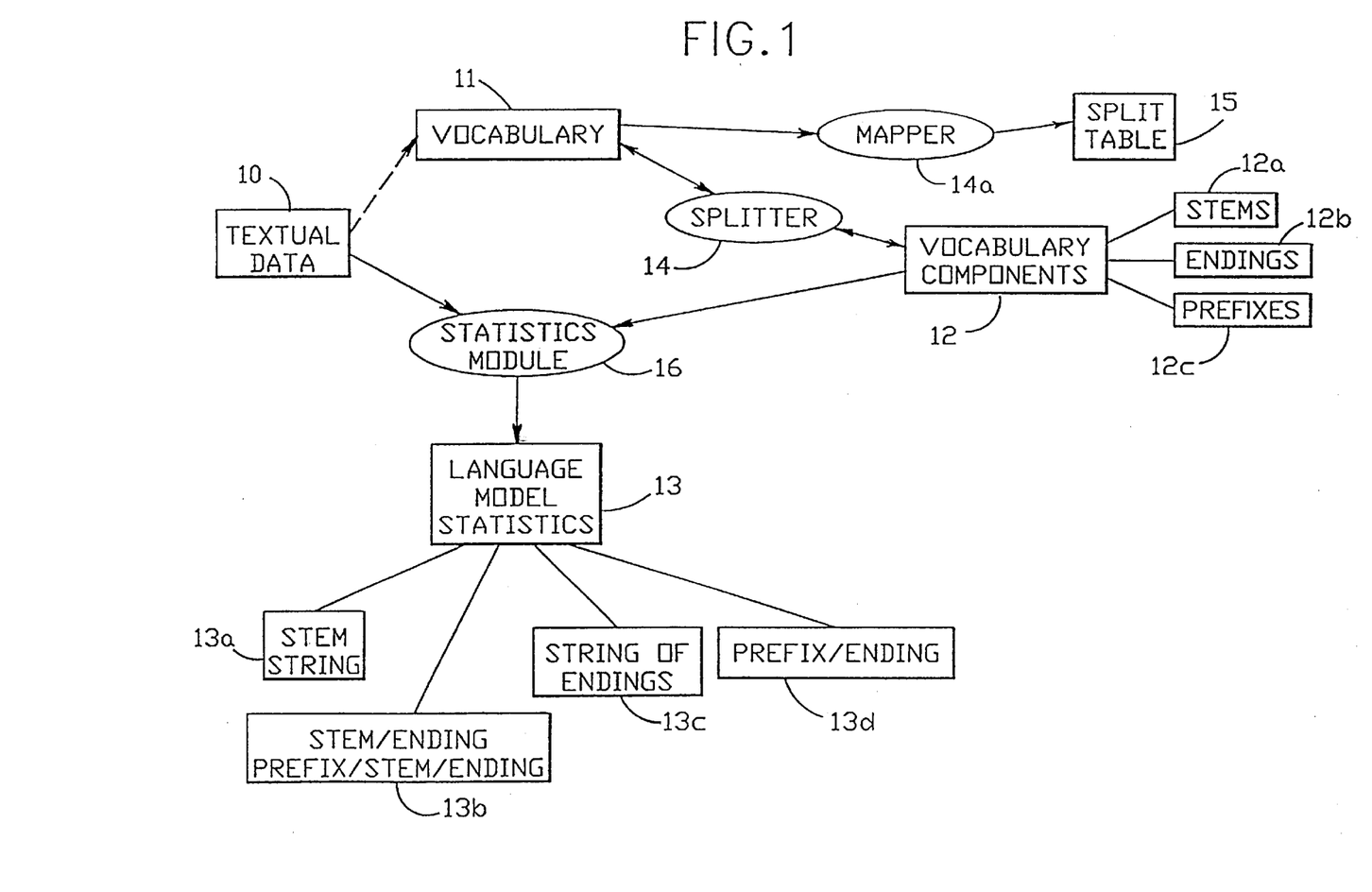
FIG. 1 is a general block diagram of an example of an apparatus for training of LM.

FIG. 1 is a general block diagram of an example of a system for training of a LM. The system comprises textual data in a machine readable form 10, which can be a large corpus of text, and a vocabulary 11, such as a dictionary. The vocabulary 11 is used to create sub-vocabularies of components 12 that comprise stems (12a), endings (12b) and prefixes (12c). These vocabulary components are produced by a splitter 14 that splits words from the vocabulary into either: a) stems and endings; or b) prefixes, stems and endings. Splitter 14 is described in more detail in FIG. 3. A split table 15 maps each word from the vocabulary 11 into a string either (stem-ending) or (prefix-stem-ending) (if prefixes are used) into which this word is split, in accordance with splitting rules 14a.

The textual data 10 and the vocabulary components 12 are used to generate language model statistics 13, that comprise various sets of statistics: 13a comprises stem statistics (trigrams, bigrams, unigrams of a stream of stems that are produced from a stream of words by cutting prefixes and endings); 13b comprises stem/ending and/or prefix/stem/ending n-grams; 13c comprises strings of endings; and 13d comprises prefix/ending.

These statistics are produced by the statistics module 16, which will be described in detail with respect to FIG. 4.

Figure 2:
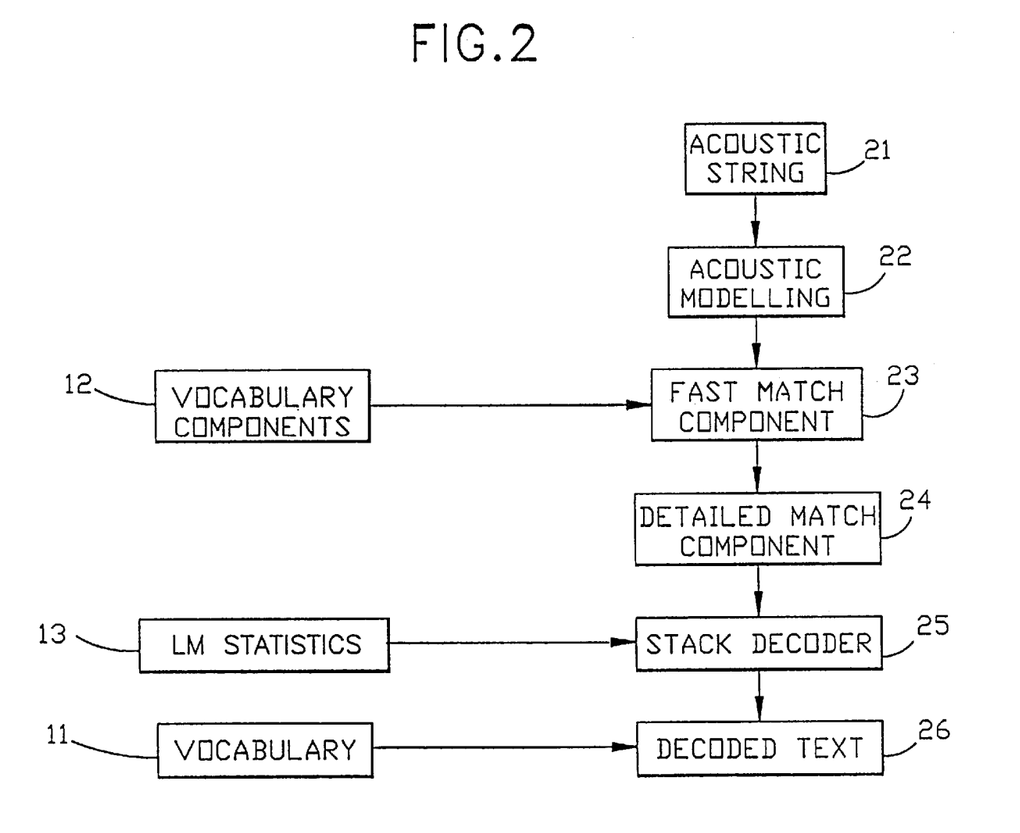
FIG. 2 is a general block diagram of an example of an apparatus for decoding with use of LM.

Referring to FIG. 2, the vocabulary 11, LM statistics 13 and vocabulary components 12 will now be described in greater detail.

Figure 6:
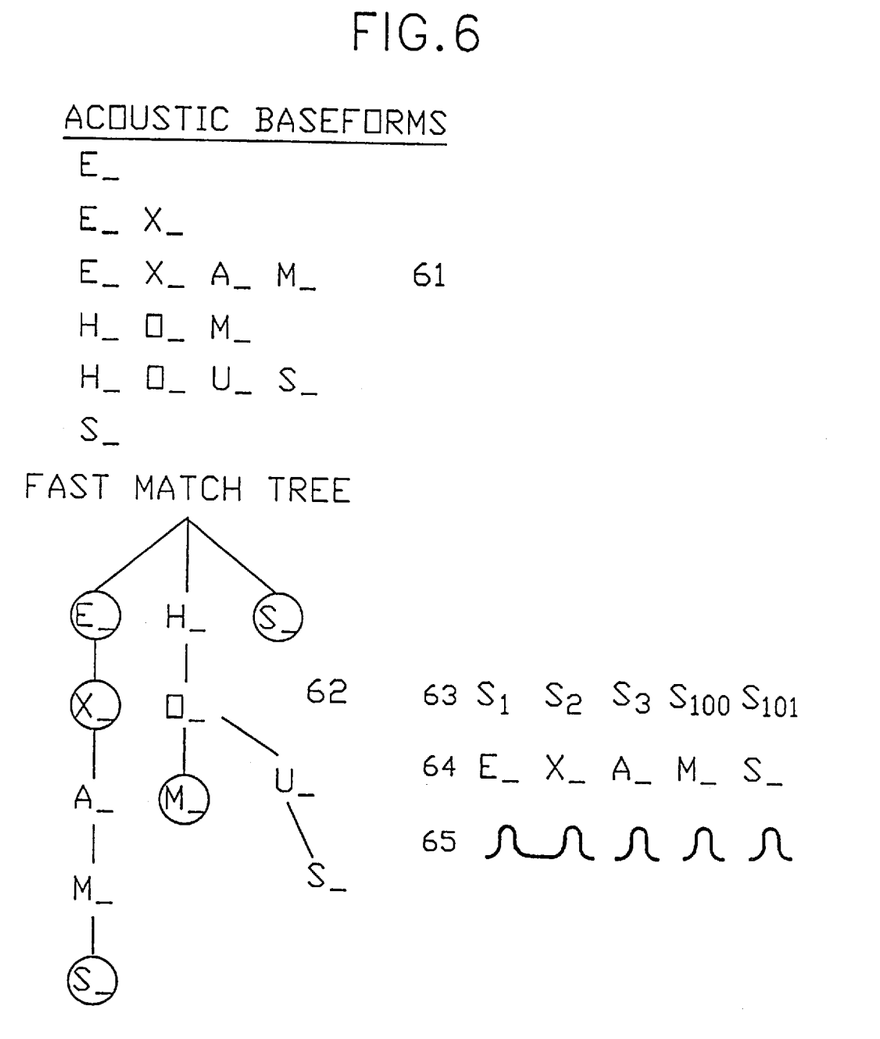
FIG. 6 describes how scores are attached to Fast Match components in accordance with the invention.

An acoustic string 21 (i.e., a string of feature vectors representing acoustical speech information) enters an acoustic module 22, which attaches to each vocabulary component (prefix, stem or ending) its acoustic model as described in detail with respect to FIG. 6. These acoustic models are sorted in accordance with their scores and a list of most probable components is selected in the Fast Match module 23, as described in L. Bahl et al., "A fast admissible method for identifying a short list of candidate words", Comp. Speech and Language, 1992, vol. 6, pp. 215–24.

After the Fast Match lists of components are computed, the selection of smaller sets of more likely candidates is performed by the Detailed Match module 24 as described in L. Bahl et al., "A Maximum Likelihood Approach to Continuous Speech Recognition", IEEE Trans. on Pattern Anal. and Machine Intel., vol. PAMI-5, No. 2, March 1983, pp. 179–90.

Figure 7:
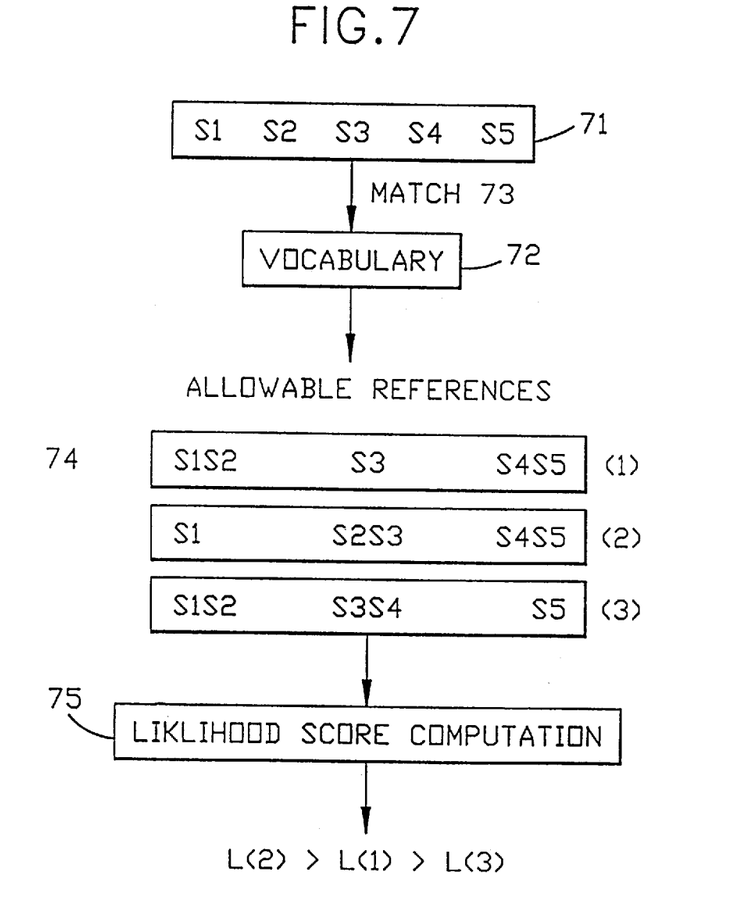
FIG. 7 describes how stems and endings are connected to words.

LM statistics 13 are used in stack decoder 25 to choose the most probable path of word components, as described in detail with respect to FIG. 7.

The final decoded text 26 is obtained by connecting word components into words from the vocabulary 11.

Figure 3A:
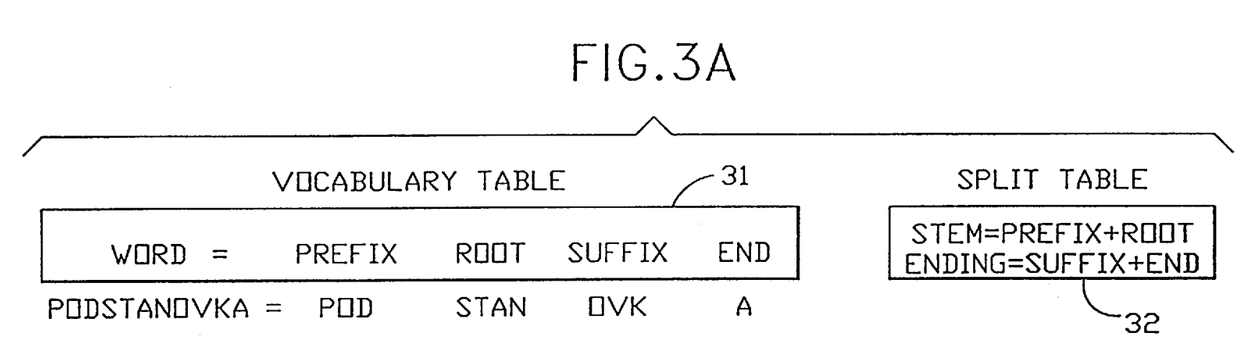
FIGS. 3a and 3b are block diagrams of examples of an apparatus for splitting words in word components (stems, prefixes, endings).
Figure 3B:
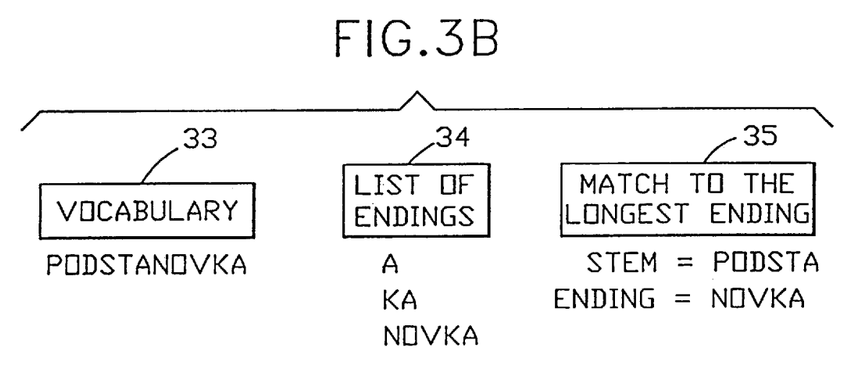

FIGS. 3a and 3b show two examples of how words can be split into stems and endings. In FIG. 3a, words are split into stems and endings in accordance with dictionary information 31. For example, for each word in the dictionary (see, e.g., C. Wolkonsky, et al., *Handbook of Russian Roots,* Columbia University Press 1961, pp. x–xxiii, 2 and 3) there exists a table of prefixes, roots, suffixes and ends that correspond with this word (e.g., a Russian word "POD-STANOVKA" has a prefix POD, a root STAN, a suffix OVK and an end A). Stems can be obtained by concatenating prefixes and roots 32 (e.g., PODSTAN) and endings by concatenating suffixes and ends (e.g., OVKA).

Another method of splitting is described in FIG. 3*b*. In this approach we need only to have a vocabulary 33 and a list of endings 34. Each word is matched against endings 35 and the longest possible ending from the list is cut from the word giving rise to a word split in the stem and the ending. For example, 36 the word PODTSTANOVKA is matched with a list of endings—A, KA, OVKA, NOVKA. The longest ending in this list is NOVKA and the split becomes PODSTA NOVKA.

The method of FIG. 3*a* is preferred to the method FIG. 3*b* since the former produces a smaller number of different stems and preserves the linguistic structure of words that can be exploited in statistical estimates of linguistic structures.

Figure 4:
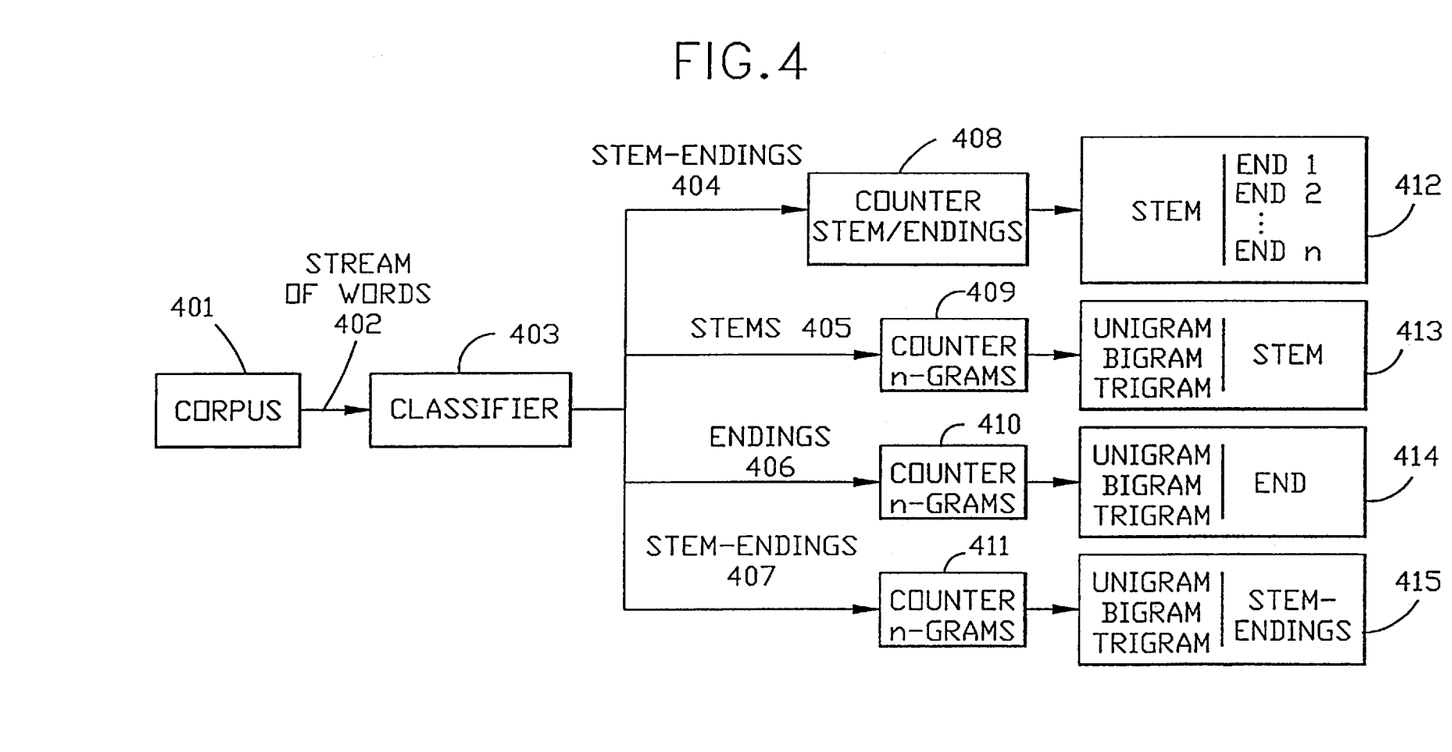
FIGS. 4 and 4a are block diagrams of alternative embodiments of a system for generating LM statistics are generated.

Referring to FIG. 4, the training of LM statistics will now be described.

The textual data (corpus 401) gives rise to a stream of words 402 that enters classifier 403. Classifier 403 interacts with the vocabulary components 12 of FIG. 1 to generate the following streams of components:

A stream of stems plus endings (404). Each word in the stream is marked with a '_' placed after a stem and before an ending in each word (e.g., KRASIVAQ VAZA NA STOLE is replaced by KRAS_IVAQ VAZ_A NA_ STOL_E).

A stream of stems (405). Each word in a stream is replaced by a stem corresponding to this word (e.g., KRAS_ IVAQ VAZ_A NA_ STOL_E is replaced by KRAS VAZ NA STOL, where _ marks an end of a stem in a word).

A stream of endings (406). Each word in a stream is replaced by an end corresponding to this word (e.g., KRAS_IVAQ VAZ_A NA STOL_E is replaced by, _IVAQ _A _ _E where _ marks an end of a stem in a word).

A stream of stems and endings (407). Each word is split into a stem and an ending and these word components are in a stream output 407 (e.g., KRASIVAQ VAZA NA STOLE is replaced by KRAS IVAQ VAZ A NA STOL E).

These streams are processed by counting modules that estimate the following statistics:

(408) module—counts distribution of endings after each stem. It generates N distributions of endings where N is the number of different stems from a stream 404.

(409) module uses the output of 405 and generates n-gram statistics of stems (for example, the stream string KRAS VAZ NA STOL has bigrams (KRAS-VAZ), (VAZ-NA), (NA-STOL) that add a count 1 to corresponding number of counts N(KRAS-VAZ), N(VAZ-NA), N(NA-STOL) of bigrams).

(410) module uses the output of 406 and generates n-gram statistics of endings.

(411) module uses the output of 407 and generates n-gram statistics of word components that consist of stems and endings in a natural order (as they occur in the stream 407).

These count estimates generated by blocks 408–411 produce corresponding Language Models (412–415) $LM_1$, $LM_2$, $LM_3$, $LM_4$ (n-gram based).

Figure 4A:
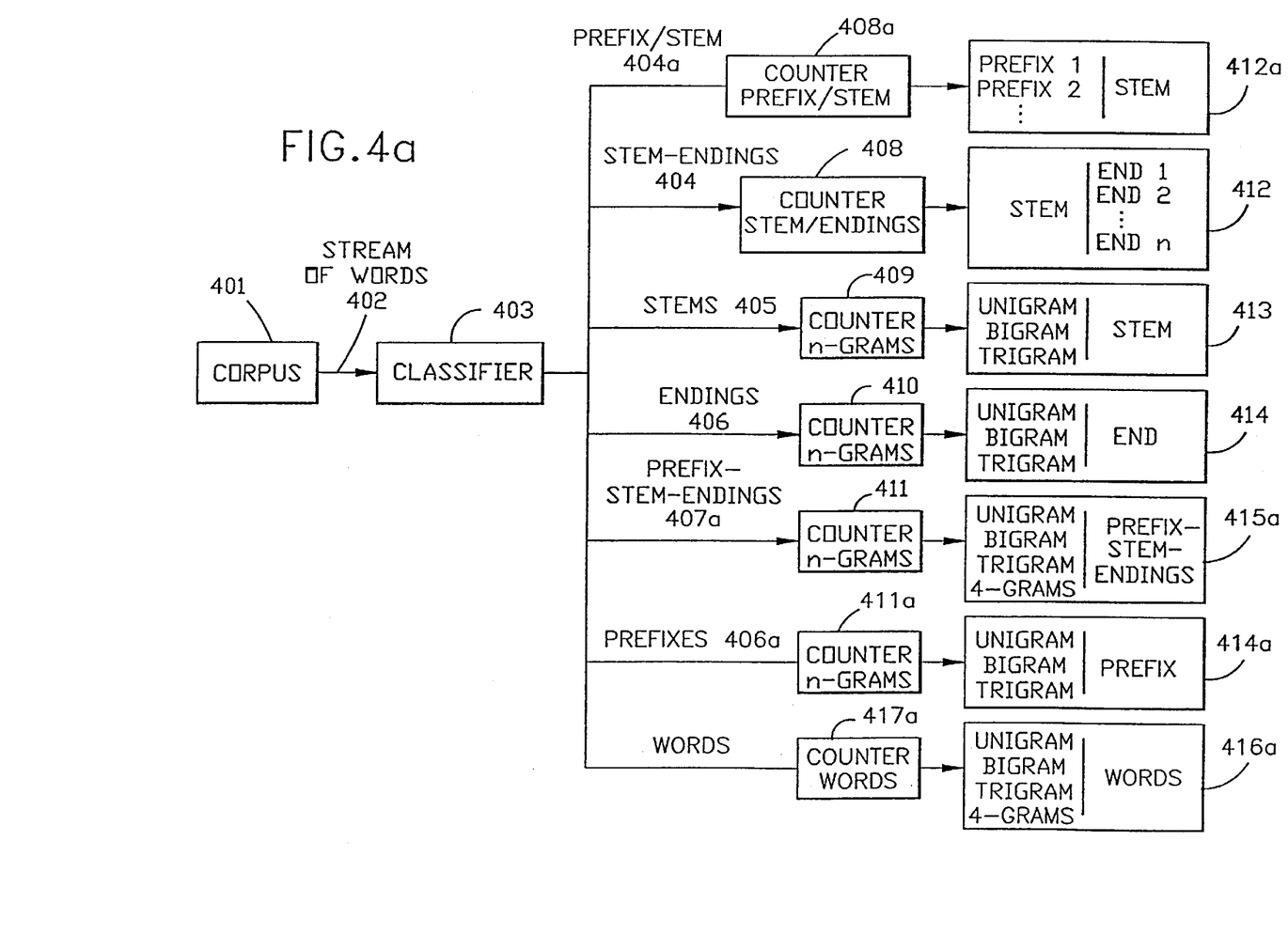

FIG. 4*a* is an alternative embodiment of the invention. Line 404*a* and downstream components 408*a* and 412*a*, and line 406*a* and downstream components 411*a* and 414*a* have been added to allow for the analysis of prefixes. These new components operate in the manner described above with resect to FIG. 4.

Also included in the embodiment of FIG. 4*a* is a counter 417*a* for counting the words processed and 418*a* is a language model on the word level, which computes unigrams, bigrams, trigrams and 4-grams given the words being processed.

The scores from language models $LM_1$ (i=1, ..., 4) produce the final LM with weighted scores:

$$\sum_{i=1}^{n} \alpha_i LM_i \; (*)$$

These n-weighted scores are chosen after decoding trials (FIG. 2) on a sample of the data to minimize decoding error rate.

These $\alpha_1$ can be defined as follows. First we fix some values of $\alpha_3, \alpha_4, \ldots, \alpha_n$ and vary $\alpha_1 = \alpha$, $\alpha_2 = 1 - \alpha - \alpha_3 - \alpha_4 - \ldots$ $\alpha_n$ to find $\overline{\alpha_1}, \overline{\alpha_2}$ for which we have a sufficiently small number of errors using the score (*) on some test data. Then we fix $\overline{\alpha_1}, \overline{\alpha_2}, \alpha_5, \alpha_6, \ldots$ and $\alpha_n$ and vary $\alpha_3, \alpha_4$ to find $\overline{\alpha_3}, \overline{\alpha_4}$ that gives rise to the lowest error rate using (*) and the test data. This process can be continued until all $\overline{\alpha_1}$, $\overline{\alpha_2}, \ldots, \overline{\alpha_n}$ (weighted scores) are found that provide a minimum error rate for the given test data. This post decoder evaluation of weighted sums is what we call decoding trials. There are other similar methods that can be used.

Figure 5:
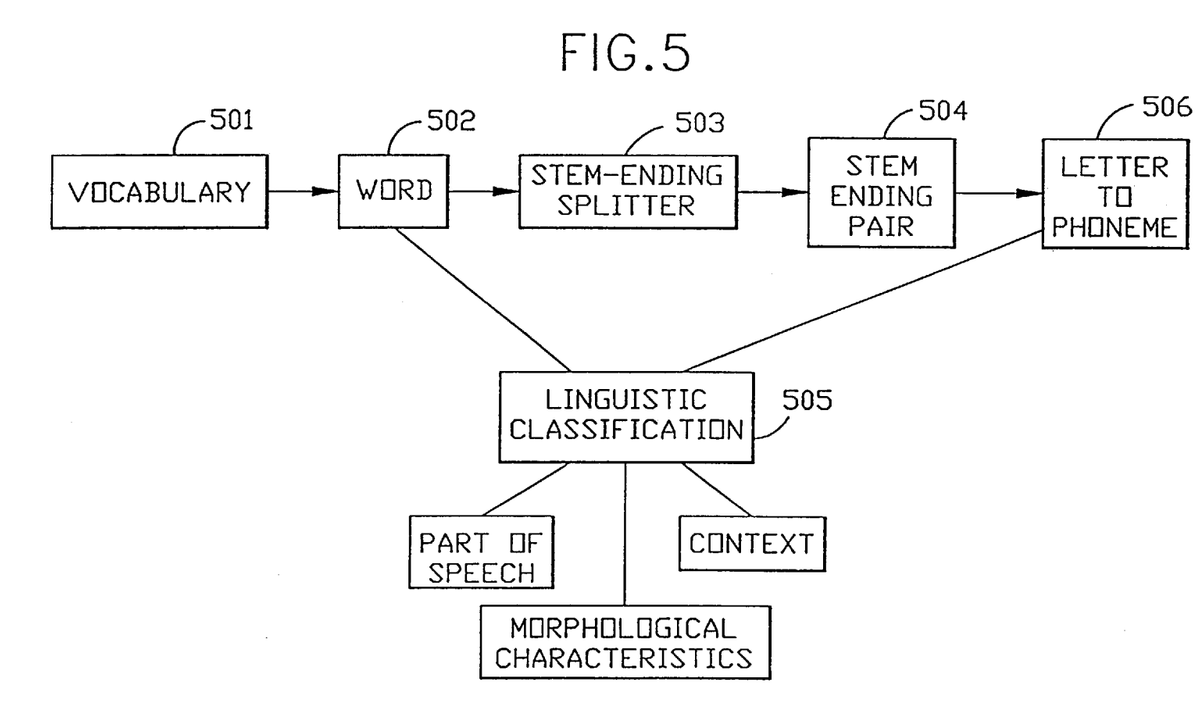
FIG. 5 is a block diagram of an example how acoustic models of word components (stems, endings) are built in accordance with the invention.

FIG. 5 describes acoustic modelling of stems and endings that is induced by spelling rules for words.

Each word 502 from a vocabulary 501 is split by means of splitter 503 into 'stem ending' pair 504 (e.g., HOROWEGO< >HOROW EGO); this pair 504 is analyzed by linguistic module 505 to classify its characteristics (part of speech of the original word, morphological characteristics, e.g., plural, whether it is an ending, suffix or end, and context characteristics for each letter in the "stem ending" pair (e.g., before "hard" or "soft" phoneme)). These characteristics are used by a letter to phoneme mapper 506 that maps each letter to a phoneme (or empty sign). In this way a spelling phonetic sequence (baseform) is built for a stem ending pair exactly as for a whole word. If there is only one exception, that resulting phonetic sequence is split at the same place where letters in a word are separated when the word is split into the "stem ending" pair. Consider the following example in FIG. 5 for a Russian word. HOROWEGO has the following phonetic representation H A R O SH E V A. This representation uses the following characteristics: stress, position and the fact that EGO is an ending. This information is used for the 'stem ending' pair in the same way the above phonetic map induced the phonetic representation for the 'stem ending' pair:

HOROW EGO→H A R O SH E V A, where the phonetic string is split at the same place where the word is split in the stem ending pair. This gives the phonetic representation for the stem

H O R O W→H A R O SH

E G O→E V A.

With this rule the same stem can have different phonetic representations in different words.

In FIG. 6, block 61 shows samples of baseforms attached to stems (ex), (exam), (hom), (hous) and endings (e), (s). Block 62 shows a sample Fast Match tree formed from these baseforms. A circled letter in this figure denotes a node at which the full path (from the root) gives rise to an ending or stem. For example, E_ represents the end (e) and H_O_M_ represents a path for the stem (hom). Note that paths corresponding to endings can be at the beginning of paths for stems, just as E_ is at the beginning of a stem E_X_A_M_.

Block 63 shows a fenemic string (that represents mathematical acoustic feature vectors). Block 64 shows a sample of a baseform that is matched against the feature acoustic vector 63. Block 65 gives plots of scores for each phoneme in the baseform 64 against the labeling string 63. The total likelihood score is computed in the standard way.

In FIG. 7, block 71 shows strings of stems and endings (S1, S2, S3, . . . ). These stems are connected consequently (via 73) and matched with the Vocabulary 72 to see which concatenations of stems produce existing words in the vocabulary. This produces allowable sequences of words in block 74.

In block 75, likelihood scores are computed for all different strings in block 74. The likelihood score involves a component Prob (end/stem), i.e., probability of the end following the stem. If the stem is not concatenated in the string, the end is assumed to be empty.

The invention can be implemented either as hardware or software running on a general purpose computer. See U.S. Pat. No. 4,831,550, incorporated herein by reference.

While the invention has been described in particular with respect to preferred embodiments thereof, modifications to the disclosed embodiments can be effected without departing from the spirit and scope of the invention.

We claim:

1. A method for generating a language model, comprising:
   providing to a classifier a corpus of words having a given sequence;
   performing a plurality of transformations on the words in the corpus, while preserving the given sequence, to generate a plurality of classes, each of the plurality of classes having a different stream of word components associated therewith, said different stream of word components being generated in accordance with one of the transformations;
   estimating statistical data representing each of the classes; and
   weighting and combining the statistical data to form the language model.

2. The method of claim 1, wherein one of the transformations identifies a stem and ending, if present, in each word, and links the stem and ending via a linking character if an ending is present, and appends the linking character at the end of the stem if no ending is present.

3. The method of claim 2, wherein the estimated statistical data includes a distribution of the occurrence of each of a plurality of endings, given each stem in the corpus.

4. The method of claim 2, wherein the spellings for words in the model are split in the same place that words are split into stems and endings.

5. The method of claim 1, wherein one of the transformations deletes the ending from each word in the corpus.

6. The method of claim 5, wherein the estimated statistical data includes an n-gram distribution of each stem in the corpus.

7. The method of claim 1, wherein one of the transformations removes the stem from all words in the corpus.

8. The method of claim 7, wherein the estimated statistical data includes an n-gram distribution of each ending in the corpus.

9. The method of claim 1, wherein one of the transformations separates the stem and ending, if present, of each word in the corpus.

10. The method of claim 9, wherein the estimated statistical data includes an n-gram distribution of stems and endings, in their natural order, for each stem and ending in the corpus.

11. The method of claim 1, wherein the plurality of the transformations comprises:
    a first transformation that identifies a stem and ending, if present, in each word, and links the stem and ending with a linking character if an ending is present, and appends the linking character at the end of the stem if no ending is present;
    a second transformation that deletes the ending, if present, from each word in the corpus;
    a third transformation that deletes the stem from each word in the corpus;
    a fourth transformation that separates the stem and ending, if present, of each word in the corpus.

12. The method of claim 11, wherein the estimated statistical data comprises:
    a distribution of the occurrence of each of a plurality of endings, given each stem in the corpus;
    an n-gram distribution of each stem in the corpus;
    an n-gram distribution of each ending in the corpus
    an n-gram distribution of stems and endings, in their natural order, for each stem and ending in the corpus.

13. The method of claim 12, wherein a zero n-gram probability is assigned to stem-ending pairs not occurring in the language.

14. The method of claim 1, further comprising identifying a stem and an ending, if present, in each word in the corpus by comparing a list of endings in the language with each word in the corpus.

15. The method of claim 1, further comprising identifying a stem and an ending in each word in the corpus by reference to a set of rules.

16. A system for generating a language model, comprising:
    means for storing a corpus of words having a meaningful sequence;
    classification means for performing a plurality of transformations on each word in the corpus, while preserving the sequence, to generate a plurality of classes, each of the plurality of classes having a different stream of word components associated therewith, said different stream of word components being generated in accordance with one of the transformations;
    means for estimating statistical data representing each of the classes;
    means for weighting and combining the statistical data to form the language model.

17. A speech recognition system including the system of claim 16, comprising:
    means for computing the likelihood of an input word of speech based on the weighted combination of statistical data forming the language model.

18. A method for generating a language model for a language, comprising the steps of:
    a) identifying a plurality of stems and endings in the language;

b) extracting the identified stems and endings from a plurality of words in the language;

c) given a set of text data in the language, converting the text to a text composed of stems and endings, and considering stems and endings as separate dictionary entries;

d) constructing a vocabulary from the text generated in step c);

e) for each stem, generating a set of probabilities for endings, the set of probabilities for endings having a size given by the number of endings;

f) using the results of step b), generating a language model for any combination of stems and endings which would give the lowest recognition score.

19. The method of claim 18, wherein the possible endings in a language are identified using a known vocabulary set for the language.

20. The method of claim 1, wherein the possible endings in a language are contained in a precompiled list.

21. A method for generating a language model for a language, comprising the steps of:

a) identifying a plurality of stems, endings and prefixes in the language;

b) extracting the identified stems, endings and prefixes from a plurality of words in the language;

c) given a set of text data in the language, converting the text to a text composed of prefixes, stems and endings, and considering prefixes, stems and endings as separate dictionary entries;

d) constructing a vocabulary from the text generated in step c);

e) for each stem, generating a set of probabilities for endings, a set of probabilities for prefixes and a set of probabilities for stems, the set of probabilities for prefixes having a size given by the number of prefixes, the set of probabilities for endings having a size given by the number of endings, and the set of probabilities for stems having a size given by the number of stems;

f) using the results of step b), generating a language model for any combination of prefixes, stems and endings which would give the lowest recognition score.

* * * * *